(12) United States Patent
Zhu et al.

(10) Patent No.: US 12,620,194 B2
(45) Date of Patent: May 5, 2026

(54) HYPERSPECTRAL IMAGE BAND SELECTION METHOD AND SYSTEM BASED ON LATENT FEATURE FUSION

(71) Applicant: ZHEJIANG NORMAL UNIVERSITY, Jinhua (CN)

(72) Inventors: Xinzhong Zhu, Jinhua (CN); Huiying Xu, Jinhua (CN); Chang Tang, Jinhua (CN); Jianmin Zhao, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 350 days.

(21) Appl. No.: 18/288,038

(22) PCT Filed: Mar. 17, 2022

(86) PCT No.: PCT/CN2022/081429
§ 371 (c)(1),
(2) Date: Dec. 22, 2023

(87) PCT Pub. No.: WO2022/227914
PCT Pub. Date: Nov. 3, 2022

(65) Prior Publication Data
US 2024/0212307 A1     Jun. 27, 2024

(30) Foreign Application Priority Data

Apr. 25, 2021    (CN) .......................... 202110447625.2

(51) Int. Cl.
*G06V 10/26*          (2022.01)
*G06V 10/58*          (2022.01)
*G06V 10/80*          (2022.01)
(52) U.S. Cl.
CPC .............. *G06V 10/26* (2022.01); *G06V 10/58* (2022.01); *G06V 10/806* (2022.01)

(58) Field of Classification Search
CPC ...... G06V 10/26; G06V 10/58; G06V 10/806; G06V 10/7715; G06V 10/267;
(Continued)

(56) References Cited

U.S. PATENT DOCUMENTS 9,622,662 B2 * 4/2017 Zuzak .................. A61B 5/0075
10,783,371 B2 * 9/2020 Jia .......................... G06V 20/13
(Continued)

FOREIGN PATENT DOCUMENTS

CN          103914705 A          7/2014
CN          105184314 A          12/2015
(Continued)

OTHER PUBLICATIONS

Sreenath Rao Vantaram, Sankaranarayanan Piramanayagam, Eli Saber, David Messinger, "Spatial segmentation of multi/ hyperspectral imagery by fusion of spectral-gradient-textural attributes," J. Appl. Rem. Sens. 9(1) 095086 (Mar. 31, 2015) https:// doi.org/10.1117/1.JRS.9.095086 (Year: 2015).*
(Continued)

*Primary Examiner* — Wesley J Tucker
(74) *Attorney, Agent, or Firm* — Bayramoglu Law Offices LLC

(57)          ABSTRACT

A hyperspectral image band selection method based on latent feature fusion comprises: S11, inputting a hyperspectral image cube and segmenting the inputted hyperspectral image cube into several regions by superpixel segmentation; S12, learning low-dimensional latent features corresponding to the several regions from the several regions respectively to obtain a latent feature matrix of all the regions; S13, calculating an average Laplacian matrix and an average latent feature matrix of the hyperspectral image cube; S14, fusing the latent feature matrix, the average Laplacian matrix, and the average latent feature matrix of all the
(Continued)

regions to obtain a low-dimensional self-representation matrix of the hyperspectral image cube; and S15, clustering the low-dimensional self-representation matrix by a k-means algorithm to obtain an optimal band subset of the hyperspectral image cube.

10 Claims, 12 Drawing Sheets

(58) Field of Classification Search
CPC ................. G06V 10/44; G06F 18/2411; G06F 18/23213; G06F 18/253
See application file for complete search history.

(56) References Cited

U.S. PATENT DOCUMENTS

| | | | | |
|---|---|---|---|---|
| 11,206,976 | B2* | 12/2021 | Smith ................. | A61B 3/1025 |
| 11,222,203 | B2* | 1/2022 | Dante ................... | A24B 15/18 |
| 11,410,295 | B2* | 8/2022 | Nipe ...................... | G06T 7/0008 |
| 2013/0154150 | A1* | 6/2013 | Shimazoe .......... | H01M 8/0286 |
| | | | | 264/161 |
| 2014/0137877 | A1* | 5/2014 | Deevi ................... | G01N 21/84 |
| | | | | 356/303 |
| 2015/0294458 | A1* | 10/2015 | Biernat ............... | A61B 3/0091 |
| | | | | 382/131 |
| 2016/0162760 | A1* | 6/2016 | Skaff ................... | G06F 18/2411 |
| | | | | 382/159 |
| 2016/0307073 | A1* | 10/2016 | Moody ................. | G06V 20/13 |
| 2019/0311230 | A1* | 10/2019 | Mahapatra ............ | G06N 3/047 |
| 2022/0222858 | A1* | 7/2022 | Almog ................. | H04N 19/182 |
| 2022/0392598 | A1* | 12/2022 | Giles ................... | A61B 5/0075 |
| 2023/0114877 | A1* | 4/2023 | Pan ........................ | G06V 20/10 |
| | | | | 382/181 |
| 2023/0214982 | A1* | 7/2023 | Michel ................. | G06V 10/255 |
| | | | | 382/110 |
| 2024/0264088 | A1* | 8/2024 | Gupta ................... | G01N 21/94 |
| 2025/0342681 | A1* | 11/2025 | Zhou ................... | G06V 10/761 |

FOREIGN PATENT DOCUMENTS

| | | |
|---|---|---|
| CN | 105989592 A | 10/2016 |
| CN | 106529508 A | 3/2017 |
| CN | 113269201 A | 8/2021 |

OTHER PUBLICATIONS

Sayyed Hamed Alizadeh Moghaddam, Mehdi Mokhtarzade, et al. "A feature extraction method based on spectral segmentation and integration of hyperspectral images", International Journal of Applied Earth Observation and Geoinformation, vol. 89, Jul. 2020 (Year: 2020).*

* cited by examiner number of iteration times

HYPERSPECTRAL IMAGE BAND SELECTION METHOD AND SYSTEM BASED ON LATENT FEATURE FUSION

CROSS REFERENCE TO THE RELATED APPLICATIONS

This application is the national phase entry of International Application No. PCT/CN2022/081429, filed on Mar. 17, 2022, which is based upon and claims priority to Chinese Patent Application No. 202110447625.2, filed on Apr. 25, 2021, the entire contents of which are incorporated herein by reference.

TECHNICAL FIELD

The present application relates to the field of hyperspectral remote-sensing image band selecting technology, and in particular to a hyperspectral image band selection method and system based on latent feature fusion.

BACKGROUND

Hyperspectral sensors capture spectral and spatial information of target scenes by collecting dozens or even hundreds of continuous hyperspectral bands. Compared with RGB images, hyperspectral images have richer information and higher resolution. With the continuous development and maturation of hyperspectral imaging techniques and image classification techniques, hyperspectral images are widely used in various fields, such as salient object detection, medical image processing, mineral exploration, and the like. However, it is important to perform dimensionality reduction processing on the hyperspectral images to solve the problem of dimensional disasters.

Hyperspectral dimensionality reduction can be roughly divided into two categories, namely feature extraction and feature selection, wherein in the hyperspectral field, the feature selection is also known as band selection. Usually, band selection is performed in the original feature space, i.e. only some representative bands are selected from the entire hyperspectral images to form a feature band subset without changing the original data information, thus the physical meaning of the original data can be reserved, and band redundancy in the original hyperspectral data is reduced.

According to the separability of category labels, the band selection can be further divided into two types: supervised band selection and unsupervised band selection. The unsupervised band selection only requires selecting a subset of feature bands based on the importance of the bands. Some measurement indicators are provided for the importance of a certain band, such as information divergence, minimum noise value, Euclidean distance, and the like.

Clustering-based methods have attracted much attention in the unsupervised band selection in recent years. In most clustering-based band selection methods, firstly, each band is stretched into a single feature vector, and then hyperspectral bands are selected based on the corresponding objective function. However, actually, for a certain band, different regions often correspond to different objects, and their spectral characteristics are different. In addition, high-dimensional pixel features of each band contain a large amount of redundant information, which limits the performance of hyperspectral band selection. Therefore, it is not appropriate to treat each band directly as a single feature vector.

SUMMARY

In response to the defects in the prior art, the present application aims to provide a hyperspectral image band selection method and system based on latent feature fusion.

In order to achieve the above objective, the present application adopts the following technical solutions:

A hyperspectral image band selection method based on latent feature fusion comprises:

S1, inputting a hyperspectral image cube and segmenting the inputted hyperspectral image cube into several regions by superpixel segmentation;

S2, learning low-dimensional latent features corresponding to the several regions from the several regions respectively to obtain a latent feature matrix of all the regions;

S3, calculating an average Laplacian matrix and an average latent feature matrix of the hyperspectral image cube;

S4, fusing the latent feature matrix, the average Laplacian matrix, and the average latent feature matrix of all the regions to obtain a low-dimensional self-representation matrix of the hyperspectral image cube; and S5, clustering the obtained low-dimensional self-representation matrix by a k-means algorithm to obtain an optimal band subset of the hyperspectral image cube.

Further, in S1, segmenting the inputted hyperspectral image cube into several regions by superpixel segmentation is completed by adopting an ERS entropy rate superpixel segmentation algorithm.

Further, in S1, the inputted hyperspectral image cube is segmented into several regions, with a number of the segmented regions represented as:

$$N = 500 \times \frac{N_z}{P} + 40 \times \frac{N_z}{N_b \times \sqrt{res}}$$

wherein N represents an optimal segmentation number for each hyperspectral image cube; $N_z$ represents a number of non-zero regions at an edge of a detected hyperspectral image; P represents pixels contained in each band; $N_b$ represents a fixed constant; res represents a spatial resolution of each hyperspectral image.

Further, in S2, the low-dimensional latent features corresponding to the several regions are learned from the several regions respectively to obtain the latent feature matrix of all the segmented regions, expressed as:

$$\max_{Y^{(i)}} Tr\left(Y^{(i)^T} E^{(i)} Y^{(i)}\right) \text{ s.t. } Y^{(i)^T} Y^{(i)} = I$$

wherein $Y^{(i)}$ represents a low-dimensional latent feature matrix corresponding to the i-th segmented region; $E^{(i)}$ represents a Laplacian matrix corresponding to the i-th segmented region; I represents an unitary matrix; the Laplacian matrix corresponding to each segmented region is specifically represented as follows:

$$E^{(i)} = D^{-\frac{1}{2}} W D^{-\frac{1}{2}}$$

3 wherein W represents a similarity matrix between samples in each segmented region; D represents a diagonal matrix, represented as:

$$D_{jj} = \sum W_{:,j}$$

wherein j represents the j-th sample in the segmented region; $D_{jj}$ represents elements in the j-th row and j-th column of the matrix $$D; \sum W_{:,j}$$

represents a sum of all elements in the j-th column of W.

Further, in S4, the latent feature matrix, the average Laplacian matrix, and the average latent feature matrix of all the regions are fused to obtain the low-dimensional self-representation matrix of the hyperspectral image cube, expressed as:

$$\max_{F,R,\gamma} Tr\left(F^T \sum_{i=1}^{N} \gamma_i Y^{(i)} R^{(i)}\right) + \lambda Tr\left(F^T \overline{F}\right) + \beta Tr\left(F^T LF\right)$$

$$\text{s.t. } F^T F = I_d, R^{(i)^T} R^{(i)} = I_d, \sum_{i=1}^{N} \gamma_i^2 = 1, \gamma_i \geq 0$$

wherein F represents a low-dimensional self-representation matrix of the fused hyperspectral image; $\gamma_i$ represents a contribution rate of each segmented region; $Y^{(i)}$ represents a low-dimensional latent feature matrix corresponding to the i-th segmented region; $R^{(i)}$ represents a rotation matrix corresponding to the i-th segmented region; $\overline{F}$ represents an average latent feature matrix; L represents an average Laplacian matrix; $\lambda$ and $\beta$ both represent equilibrium parameters; T represents the transposition of the matrix; $I_d$ represents an identity matrix with a size of d*d. The specific solution for the average Laplacian matrix L is shown as follows:

$$L = \frac{1}{N}\sum_{i=1}^{N} E^{(i)}$$

wherein $E^{(i)}$ is the Laplacian matrix corresponding to each segmented region; N is the number of the segmented regions corresponding to an original dataset; the specific solution for the average latent feature matrix $\overline{F}$ is shown as follows:

$$\max_{\overline{F}} Tr\left(\overline{F}^T L\overline{F}\right) \text{ s.t. } \overline{F}^T \overline{F} = I$$

Correspondingly, a hyperspectral image band selection system based on latent feature fusion is also provided, and comprises:

a hyperspectral image segmentation module, which is used for inputting a hyperspectral image cube and segmenting the inputted hyperspectral image cube into several regions by superpixel segmentation;

a latent feature learning module, which is used for learning low-dimensional latent features corresponding to the several regions from the several regions respectively to obtain a latent feature matrix of all the regions;

a calculation module, which is used for calculating an average Laplacian matrix and an average latent feature matrix of the hyperspectral image cube;

a latent feature fusion module, which is used for fusing the latent feature matrix, the average Laplacian matrix, and the average latent feature matrix of all the regions to obtain a low-dimensional self-representation matrix of the hyperspectral image cube; and a hyperspectral band selecting module, which is used for clustering the obtained low-dimensional self-representation matrix by a k-means algorithm to obtain an optimal band subset of the hyperspectral image cube.

Further, in the hyperspectral image segmentation module, segmenting the inputted hyperspectral image cube into several regions by superpixel segmentation is completed by adopting an ERS entropy rate superpixel segmentation algorithm.

Further, in the hyperspectral image segmentation module, the inputted hyperspectral image cube is segmented into several regions, with a number of the segmented regions represented as:

$$N = 500 \times \frac{N_z}{P} + 40 \times \frac{N_z}{N_b \times \sqrt{res}}$$

wherein N represents an optimal segmentation number for each hyperspectral image cube; $N_z$ represents a number of non-zero regions at an edge of a detected hyperspectral image; P represents pixels contained in each band; $N_b$ represents a fixed constant; res represents a spatial resolution of each hyperspectral image.

Further, in the latent feature learning module, the low-dimensional latent features corresponding to the several regions are learned from the several regions respectively to obtain the latent feature matrix of all the segmented regions, expressed as:

$$\max_{Y^{(i)}} Tr\left(Y^{(i)^T} E^{(i)} Y^{(i)}\right) \text{ s.t. } Y^{(i)^T} Y^{(i)} = I$$

wherein $Y^{(i)}$ represents a low-dimensional latent feature matrix corresponding to the i-th segmented region; $E^{(i)}$ represents a Laplacian matrix corresponding to the i-th segmented region; I represents an identity matrix;

the Laplacian matrix corresponding to each segmented region is specifically represented as follows:

$$E^{(i)} = D^{-\frac{1}{2}} WD^{-\frac{1}{2}}$$

wherein W represents a similarity matrix between samples in each segmented region; D represents a diagonal matrix, represented as:

$$D_{jj} = \sum W_{:,j}$$

wherein j represents the j-th sample in the segmented region; $D_{jj}$ represents elements in the j-th row and j-th column of the matrix $$D; \sum W_{:,j}$$

represents a sum of all elements in the j-th column of W.

Further, in the latent feature fusion module, the latent feature matrix, the average Laplacian matrix, and the average latent feature matrix of all the regions are fused to obtain the low-dimensional self-representation matrix of the hyperspectral image cube, expressed as:

$$\max_{F,R,\gamma} Tr\left(F^T \sum\nolimits_{i=1}^{N} \gamma_i Y^{(i)} R^{(i)}\right) + \lambda Tr\left(F^T \overline{F}\right) + \beta Tr\left(F^T L F\right)$$

$$\text{s.t. } F^T F = I_d, \ {R^{(i)}}^T R^{(i)} = I_d, \ \sum\nolimits_{i=1}^{N} \gamma_i^2 = 1, \ \gamma_i \geq 0$$

wherein F represents a low-dimensional self-representation matrix of the fused hyperspectral image; $\gamma_i$ represents a contribution rate of each segmented region; $Y^{(i)}$ represents a low-dimensional latent feature matrix corresponding to the i-th segmented region; $R^{(i)}$ represents a rotation matrix corresponding to the i-th segmented region; $\overline{F}$ represents an average latent feature matrix; L represents an average Laplacian matrix; $\lambda$ and $\beta$ both represent equilibrium parameters; T represents the transposition of the matrix; $I_d$ represents an identity matrix with a size of d*d. The specific solution for the average Laplacian matrix L is shown as follows:

$$L = \frac{1}{N} \sum_{i=1}^{N} E^{(i)}$$

wherein $E^{(i)}$ is the Laplacian matrix corresponding to each segmented region; N is the number of the segmented regions corresponding to an original dataset.

The specific solution for the average latent feature matrix $\overline{F}$ is shown as follows:

$$\max_{\overline{F}} Tr\left(\overline{F}^T L F\right) \text{ s.t. } \overline{F}^T \overline{F} = I$$

Compared with the prior art, the present application mainly uses superpixel segmentation to segment the hyperspectral image into a plurality of regions, and low-dimensional latent features are learned from each segmented region to further enhance the separability of ground objects between different regions. Then, a shared latent feature self-representation matrix of the hyperspectral image is obtained by fusing the low-dimensional latent features of each segmented region, thereby reducing spectral differences between different regions. Finally, the k-means algorithm is used to select the optimal feature band subset from the shared latent feature self-representation matrix.

DETAILED DESCRIPTION OF THE EMBODIMENTS

The embodiments of the present application are illustrated below through specific examples, and other advantages and effects of the present application can be easily understood by those skilled in the art based on the contents disclosed herein. The present application can also be implemented or applied through other different specific embodiments. Various modifications or changes to the details described in the specification can be made based on different perspectives and applications without departing from the spirit of the present application. It should be noted that, unless conflicting, the embodiments and features of the embodiments below may be combined with each other.

In response to the defects in the prior art, the present application provides a hyperspectral image band selection method and system based on latent feature fusion.

Embodiment I

Figure 1:
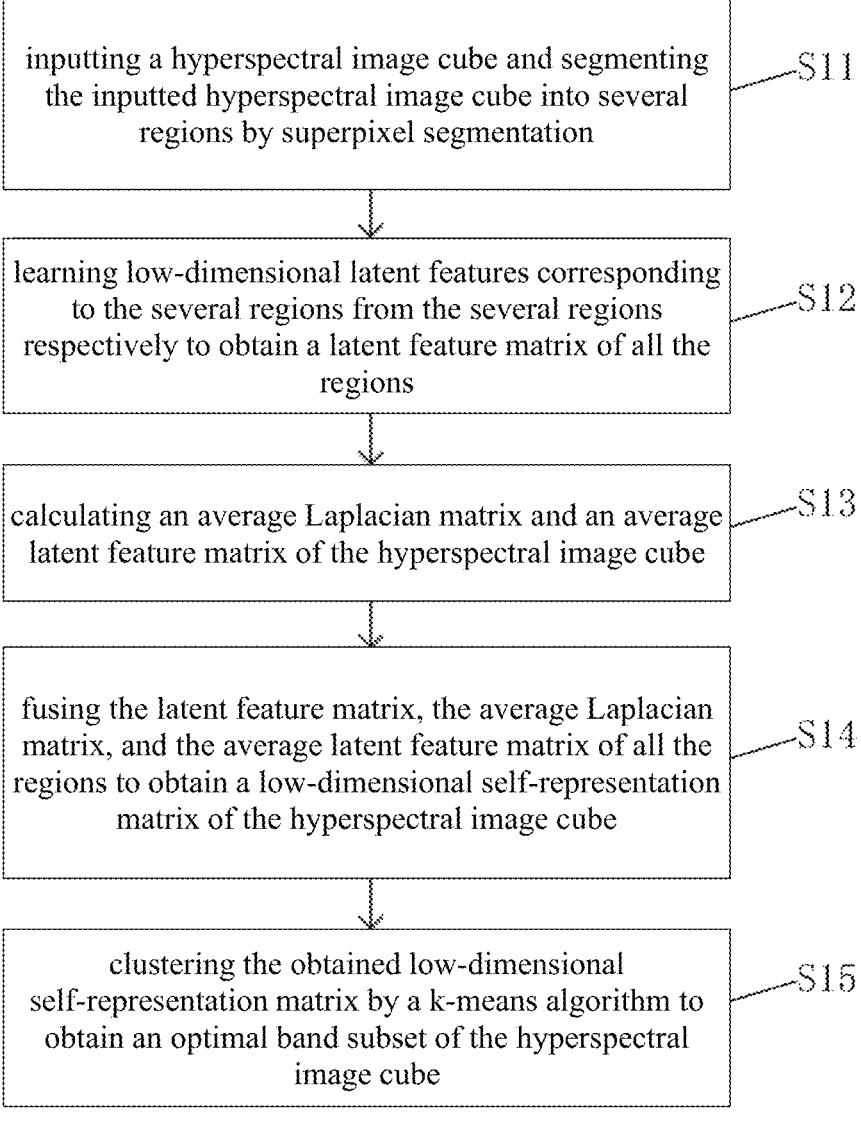
FIG. 1 shows a flowchart of a hyperspectral image band selection method based on latent feature fusion according to Embodiment I.
Figure 2:
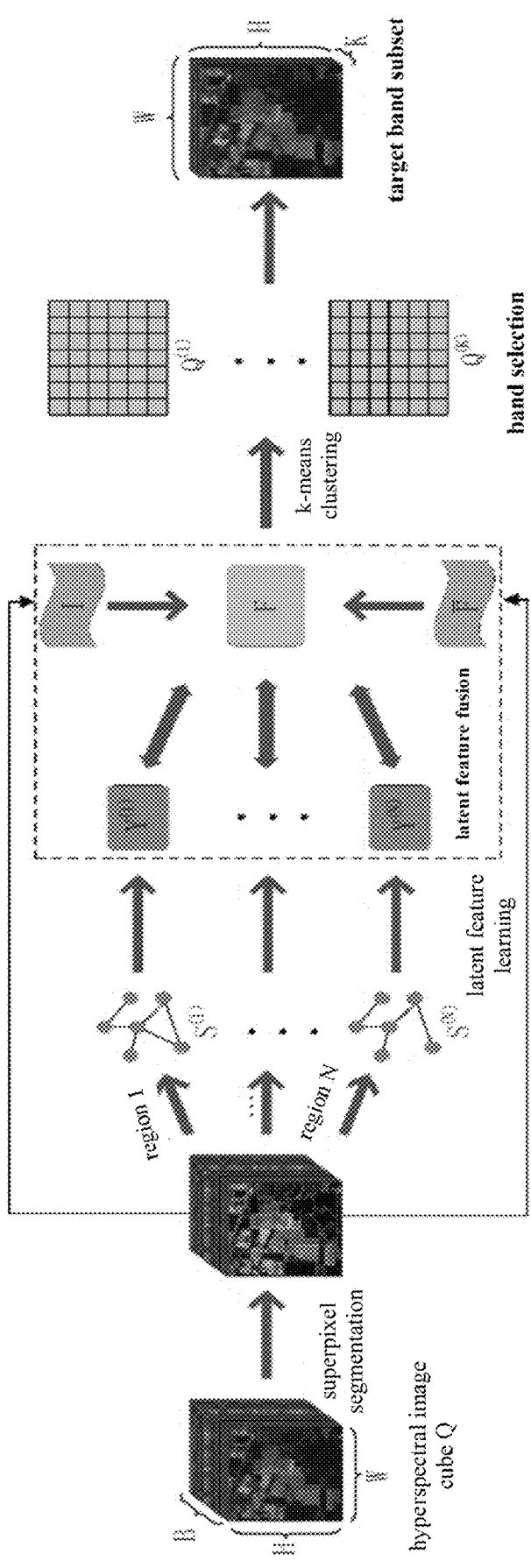
FIG. 2 shows a block diagram of a hyperspectral image band selection method based on latent feature fusion according to Embodiment I.

The embodiment provides a hyperspectral image band selection method based on latent feature fusion, as shown in FIGS. 1-2, and the method comprises:

S11, inputting a hyperspectral image cube and segmenting the inputted hyperspectral image cube into several regions by superpixel segmentation;

S12, learning low-dimensional latent features corresponding to the several regions from the several regions respectively to obtain a latent feature matrix of all the regions;

S13, calculating an average Laplacian matrix and an average latent feature matrix of the hyperspectral image cube;

S14, fusing the latent feature matrix, the average Laplacian matrix, and the average latent feature matrix of all the regions to obtain a low-dimensional self-representation matrix of the hyperspectral image cube; and S15, clustering the obtained low-dimensional self-representation matrix by a k-means algorithm to obtain an optimal band subset of the hyperspectral image cube.

In the embodiment, hyperspectral bands from different regions often correspond to different targets, and due to the low spatial resolution of the hyperspectral images, distinguishing objects in some complex terrains is not very clear.

Therefore, we believe that learning the corresponding latent features from different regions is reasonable and effective, and it is also beneficial to improve the clustering performance of the hyperspectral bands. Therefore, in the embodiment, the hyperspectral image is segmented into a plurality of isomorphic regions. In addition, for all of the segmented regions, corresponding low-dimensional latent features are learned from them instead of using their original high-dimensional pixel features to enhance the separability of ground objects between different regions. Then, a shared latent feature of the hyperspectral images is learned by fusing the latent low-dimensional features of all the segmented regions, thereby eliminating the effects of spectral differences between different regions. Finally, the low-dimensional self-representation matrix of the hyperspectral images is clustered by the k-means algorithm to obtain the optimal band subset. In this article, the embodiment provides a hyperspectral image band selection method based on multi-region/region-aware latent feature fusion, called as RLFFC for short.

In S11, a hyperspectral image cube is inputted and the inputted hyperspectral image cube is segmented into several regions by superpixel segmentation.

The superpixel segmentation algorithm used in the embodiment is ERS entropy rate superpixel segmentation. Based on the characteristics of each hyperspectral dataset, the embodiment provides a method to determine the optimal segmentation number for hyperspectral data. The specific steps are as follows:

Given the hyperspectral image cube $Q \in R^{P \times B}$, wherein P represents the pixels contained in each band in the hyperspectral image cube, and B represents the number of the bands contained in the hyperspectral dataset. The specific calculation method for the number of the superpixel segmentations for each hyperspectral dataset is as follows:

$$N = 500 \times \frac{N_z}{P} + 40 \times \frac{N_z}{N_b \times \sqrt{res}}$$

wherein N represents the optimal segmentation number for each hyperspectral image cube; $N_z$ represents the number of non-zero regions at the edge of a detected image; P represents pixels contained in each band; $N_b$ represents a fixed constant and is set to 10000 in all experiments of the embodiment; and res represents a spatial resolution of each hyperspectral image.

In S12, low-dimensional latent features corresponding to the several regions are learned from the several regions respectively to obtain a latent feature matrix of all the regions. The specific calculation method is as follows:

$$\max_{Y^{(i)}} Tr\left(Y^{(i)^T} E^{(i)} Y^{(i)}\right) \text{ s.t. } Y^{(i)^T} Y^{(i)} = I$$

wherein $Y^{(i)}$ represents the low-dimensional latent feature matrix corresponding to the i-th segmented region; $E^{(i)}$ represents the Laplacian matrix corresponding to the i-th segmented region; I represents an identity matrix.

The Laplacian matrix corresponding to each segmented region is specifically represented as follows:

$$E^{(i)} = D^{-\frac{1}{2}} WD^{-\frac{1}{2}}$$

wherein W represents a similarity matrix between samples in each segmented region and is mainly used for calculating an Euclidean distance between samples to measure the similarity between the samples; D represents a diagonal matrix, expressed as:

$$D_{jj} = \sum W_{.,j}$$

wherein j represents the j-th sample in the segmented region; $D_{jj}$ represents the elements in the j-th row and j-th column of the matrix $$D; \sum W_{.,j}$$

represents the sum of all elements in the j-th column of W.

In S14, the latent feature matrix, the average Laplacian matrix, and the average latent feature matrix of all the regions are fused to obtain a shared latent feature matrix, and the matrix is regarded as a low-dimensional self-representation matrix of the hyperspectral image cube. The specific steps for latent feature fusion are as follows:

Considering the different contribution rates of each segmented region to the original hyperspectral data, the embodiment introduces parameters $\gamma$ to balance the latent features corresponding to each region. Generally speaking, if two bands are highly similar in the original feature space, the two bands should also be highly similar in the learned latent feature space. Therefore, in order to prevent the obtained fusion features from deviating too much from the latent features, the embodiment introduces an average latent feature matrix for constraining them. In addition, the embodiment also introduces Laplacian constraints to maintain consistent band similarity before and after feature fusion. The Laplacian matrix of each region can only describe the similarity between the internal bands in the region, so the embodiment uses the average Laplacian matrix of all segmented regions to measure the global similarity between the bands. In addition, the average Laplacian matrix ensures that the learned latent features can maintain the geometric structure of hyperspectrum. Therefore, the expression for latent feature fusion is as follows:

$$\max_{F,R,\gamma} Tr\left(F^T \sum_{i=1}^{N} \gamma_i Y^{(i)} R^{(i)}\right) + \lambda Tr\left(F^T \overline{F}\right) + \beta Tr\left(F^T LF\right)$$

$$\text{s.t. } F^T F = I_d, R^{(i)^T} R^{(i)} = I_d, \sum_{i=1}^{N} \gamma_i^2 = 1, \gamma_i \geq 0$$

wherein F represents the low-dimensional self-representation matrix of the fused hyperspectral image; $\gamma_i$ represents a contribution rate of each segmented region; $Y^{(i)}$ represents the low-dimensional latent feature matrix corresponding to the i-th segmented region; $R^{(i)}$ represents a rotation matrix corresponding to the i-th segmented region; $\overline{F}$ represents an average latent feature matrix; L represents an average Laplacian matrix; $\lambda$ and $\beta$ both represent equilibrium parameters; T represents the transposition of the matrix; $I_d$ represents the identity matrix with a size of d*d.

The specific solution for the average Laplacian matrix L is shown as follows:

$$L = \frac{1}{N}\sum_{i=1}^{N} E^{(i)}$$

wherein $E^{(i)}$ is the Laplacian matrix corresponding to each segmented region; N is the number of the segmented regions corresponding to an original dataset.

The specific solution for the average latent feature matrix $\bar{F}$ is shown as follows:

$$\max_{\bar{F}} Tr(\bar{F}^{T} L \bar{F}) \text{ s.t. } \bar{F}^{T}\bar{F} = I$$

The above-proposed objective function mainly includes three parameters, namely F, $$\{R^{(i)}\}_{i=1}^{N}$$

and $\gamma$. Since the three parameters are interrelated, it is difficult to solve the three parameters all at once. Therefore, the embodiment designs an alternating iteration algorithm to find the optimal solution for the objective function.

Solution of F: When $$\{R^{(i)}\}_{i=1}^{N}$$

and $\gamma$ are fixed, the objective function for latent feature fusion can be expressed as:

$$\min_{F} Tr(F^{T}G) + Tr(F^{T}AF) \text{ s.t. } F^{T}F = I_d$$

wherein $$G = -\sum_{i=1}^{N} \gamma_i Y^{(i)} R^{(i)} - \lambda \bar{F}, A = -\beta L.$$

The first-order orthogonal constraint can be solved by the algorithm proposed by Gao et al.

Solution of $$\{R^{(i)}\}_{i=1}^{N}:$$

When F and $\gamma$ are fixed, the equivalent form of the objective function for latent feature fusion is as follows:

$$\max_{R^{(i)}} Tr(R^{(i)^{T}} Z) \text{ s.t. } Z = \gamma_i Y^{(i)^{T}} F$$

wherein the objective function can be solved by singular value decomposition, with the optimal solution being $R^{(i)}=UV^{T}$, and U and V are a left singular vector and a right singular vector of Z, respectively. In addition, the objective function $$\max_{\bar{F}} Tr(\bar{F}^{T} L \bar{F})$$

can also be solved by singular value decomposition, with the optimal solution being $\bar{F}=UV^{T}$, and U and V are a left singular vector and a right singular vector of L, respectively.

Solution of $\gamma$: When F and $$\{R^{(i)}\}_{i=1}^{N}$$

are fixed, the objective function for latent feature fusion can be expressed as:

$$\max_{\gamma} \sum_{i=1}^{N} \gamma_i \sigma_i \text{ s.t. } \sum_{i=1}^{N} \gamma_i^2 = 1$$

wherein $\sigma_i = Tr(F^{T}Y^{(i)}R^{(i)})$. According to Cauchy's inequality, the optimal solution for the objective function can be obtained as $$\gamma_i = \frac{\sigma_i}{\sqrt{\sum_{i=1}^{N} \sigma_i^2}}.$$

Compared with the prior art, the embodiment mainly uses superpixel segmentation to segment the hyperspectral image into a plurality of regions, and low-dimensional latent features are learned from each segmented region to further enhance the separability of ground objects between different regions. Then, a shared latent feature self-representation matrix of the hyperspectral image is obtained by fusing the low-dimensional latent features of each segmented region, thereby reducing spectral differences between different regions. Finally, the k-means algorithm is used to select the optimal feature band subset from the shared latent feature self-representation matrix.

Embodiment II

The difference between the hyperspectral image band selection method based on latent feature fusion provided by the embodiment and that provided by Embodiment I lies in that:

in order to verify the effectiveness of the proposed RLFFC algorithm in selecting the hyperspectral bands, a large number of related experiments were conducted in the embodiment.

The experiment was mainly conducted on four common datasets, namely the Indian Pines dataset, the Salinas dataset, the KSC dataset, and the Botswana dataset. In order to evaluate the performance of RLFFC and other competitors, we selected three classifiers, including KNN, SVM, and LDA. In the experiment, the parameter k value of the KNN classifier was set to 5; SVM adopted the Gaussian kernel function uniformly. In addition, for the four datasets, the penalty coefficients of SVM were 0.5*10^4, 100, 10^4, and 10^4, respectively. γ values of the SVM were 0.5, 16, 16, and 0.5. Since all three classifiers are supervised classifiers, 10% of the entire dataset was randomly selected as training samples and the rest as test samples. In addition, since the optimal number of selected bands for each dataset was unknown, 10 numbers were selected from the range of 5-50 with an interval of 5 as the number of selected bands. In order to accurately describe the performance of all hyperspectral band selection algorithms, three indicators were used to measure the final classifier accuracy, namely overall accuracy (OA), average accuracy (AA), and Kappa coefficient (Kappa). In the experiment, all algorithms were implemented in MATLAB 2017a, using an Intel Core i7-7700 3.60 GHz CPU and 24 GB of memory.

Figure 3A:
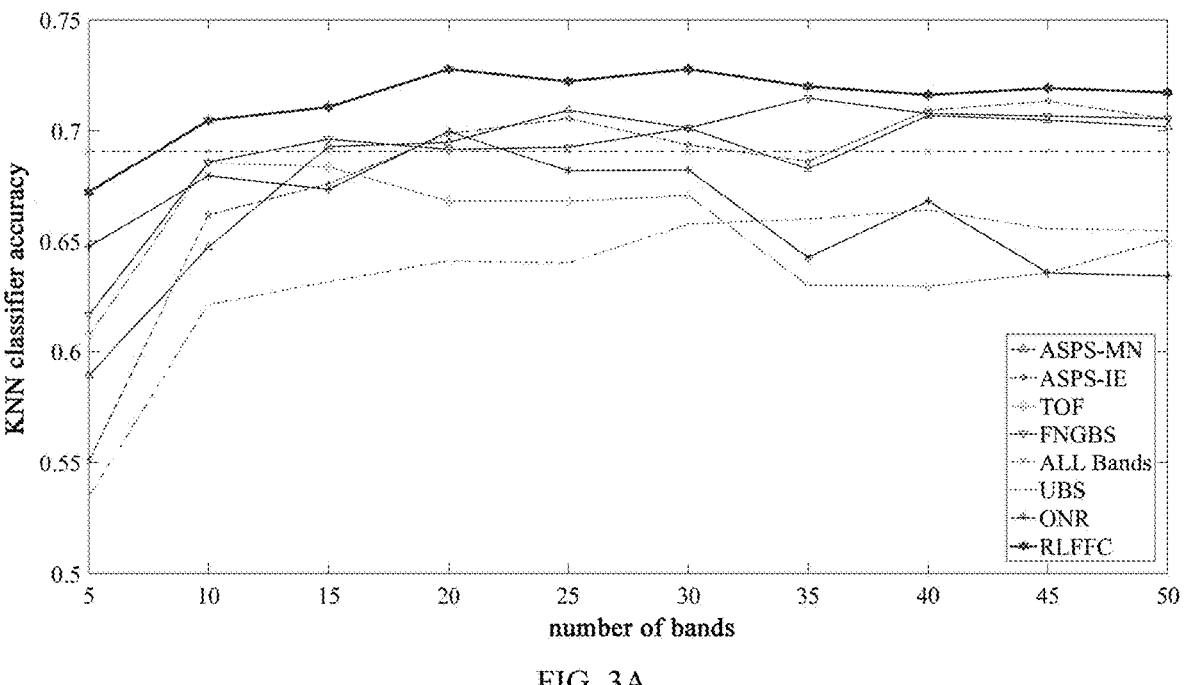
FIGS. 3A-3C show the overall-accuracy curves of different hyperspectral image band selection methods on the Indian Pines dataset according to Embodiment II.
Figure 3B:
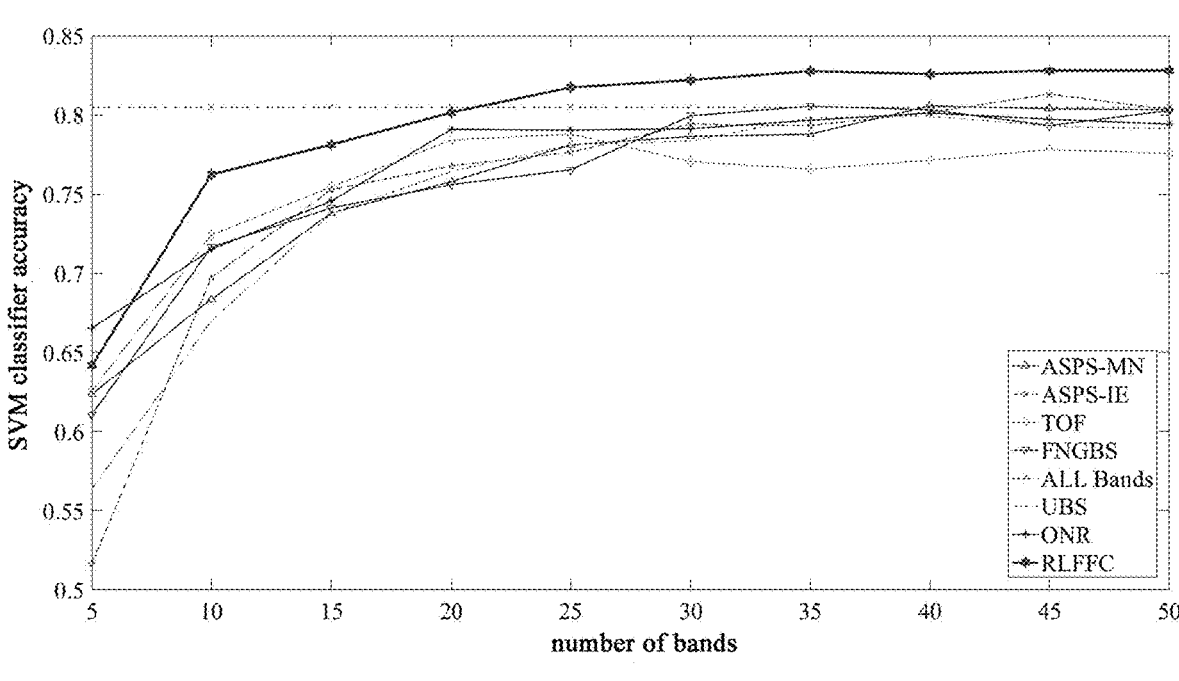
Figure 3C:
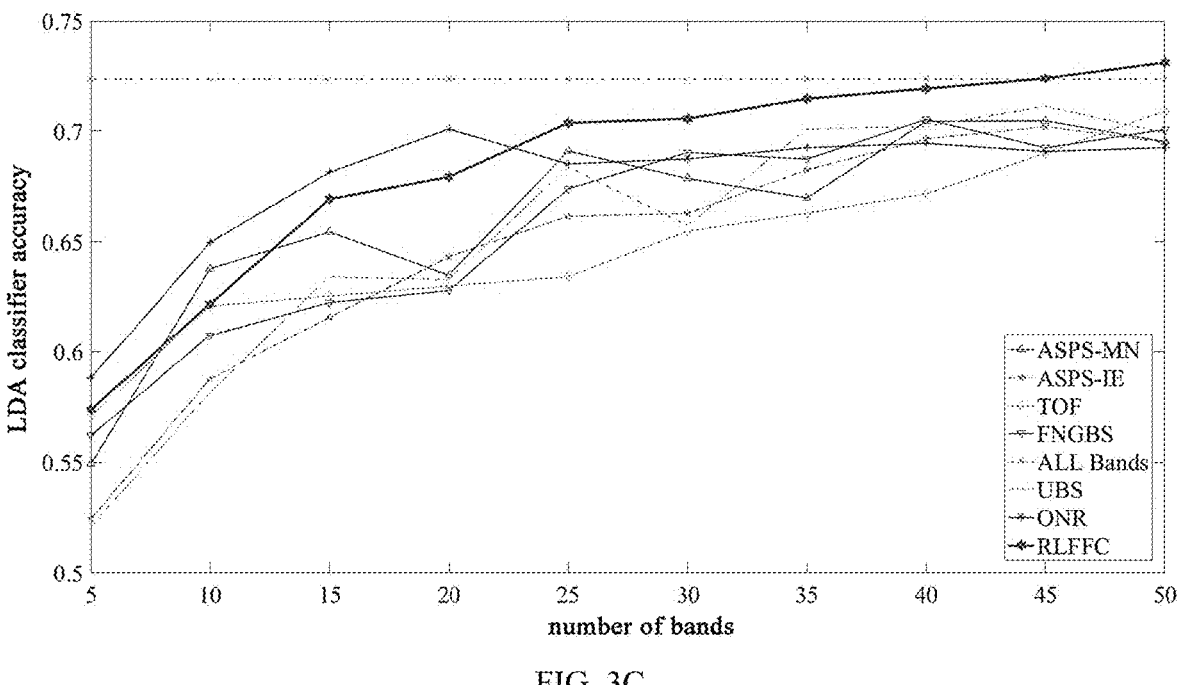

FIGS. 3A-3C show the performance of all competitors on the Indian Pines dataset. It can be clearly seen that the performance of RLFFC is optimal in most cases. It should be noted that in the first graph of FIGS. 3A-3C, when the number of the selected bands exceeds 10, the RLFFC is always higher than a baseline, while other algorithms fluctuate up and down, such as FNGBS and ASPS_MN. In addition, as the number of the selected bands increases, the performance of all algorithms except RLFFC is unstable, especially TOF and ONR. Regarding the second graph and the third graph in FIGS. 3A-3C, the performance of the RLFFC is also comparable to other algorithms. For example, in the second graph of FIGS. 3A-3C, when 10 bands are selected, the OA of the proposed method is about 4% higher than that of the second-placed ONR. Overall, the RLFFC achieved good results on the Indian Pines dataset.

Figure 4A:
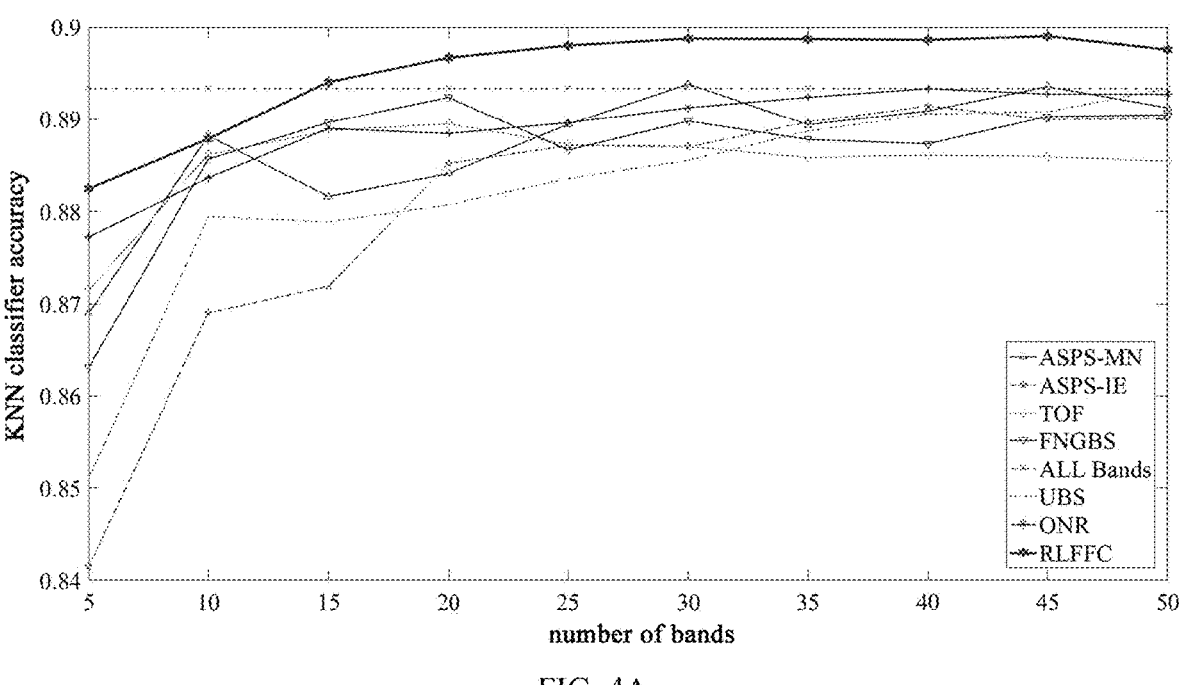
FIGS. 4A-4C show the overall-accuracy curves of different hyperspectral image band selection methods on the Salinas dataset according to Embodiment II.
Figure 4B:
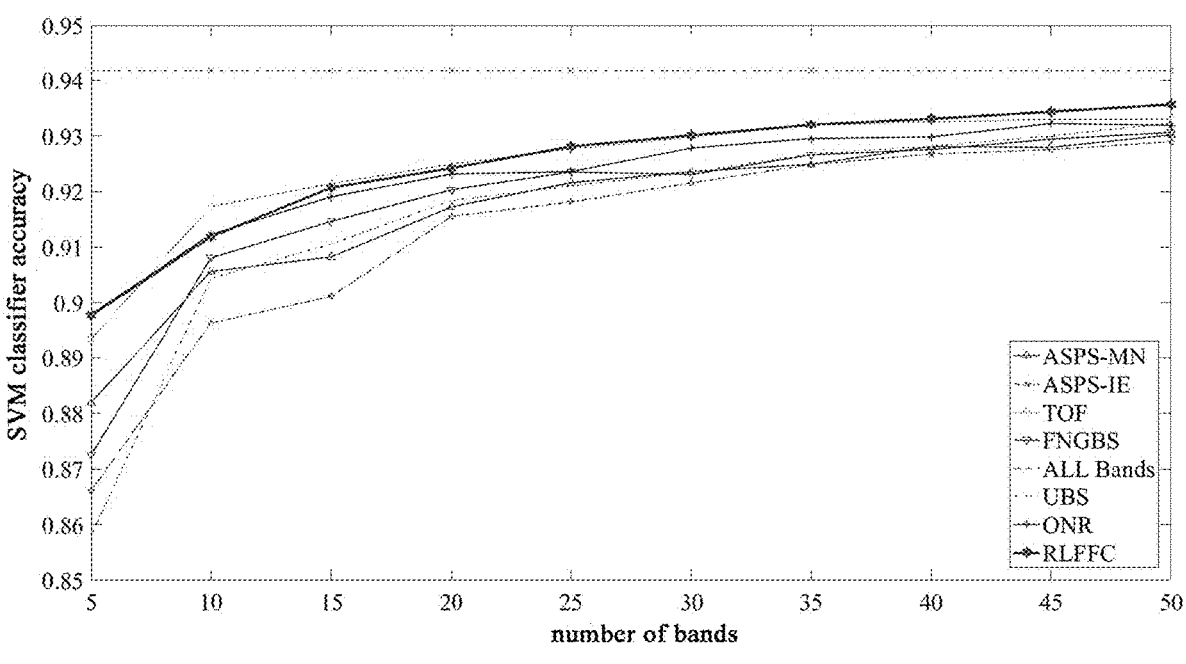
Figure 4C:
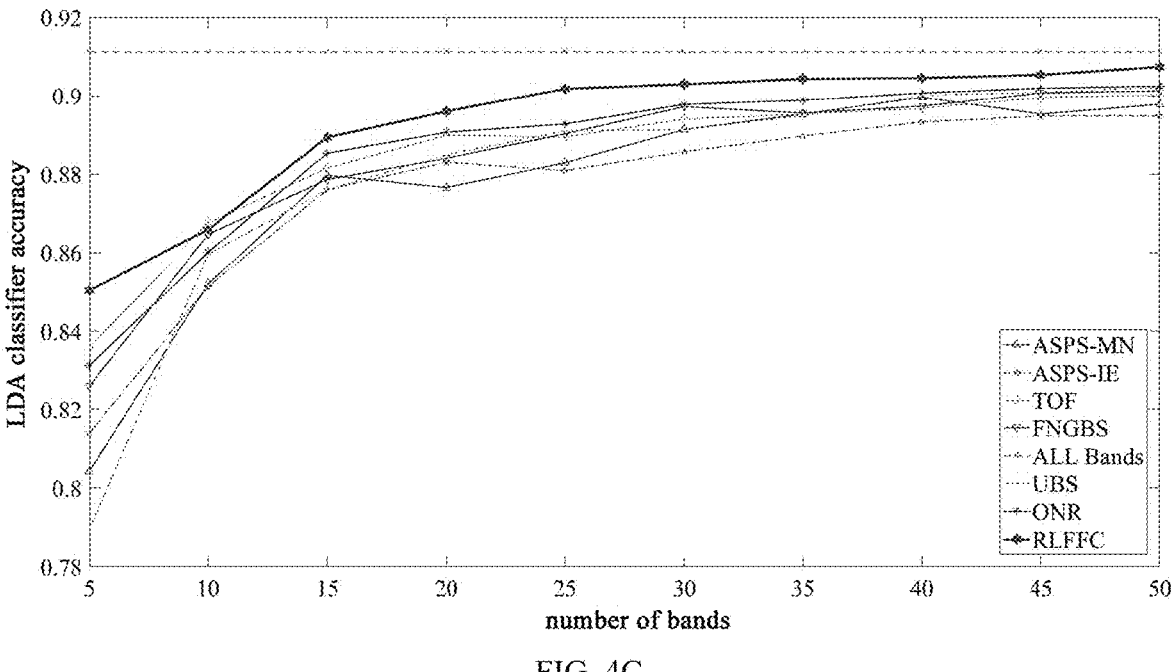

For the Salinas dataset in FIGS. 4A-4C, although the advantage is not as obvious as in FIGS. 3A-3C, it still has some comparability to other algorithms. Among all competitive algorithms, we can find that the RLFFC has achieved satisfactory results on all of the classifiers, while ASPS_IE performs poorly on the three classifiers. For example, in the first graph of FIGS. 4A-4C, when the number of the selected bands is less than 15, the results of ASPS_IE are consistently the lowest. In the second and third graphs of FIGS. 4A-4C, the results for All Bands are consistently the highest. The reason is that the dataset contains a total of 204 bands, and we only selected less than a quarter of the bands as the feature bands. However, when the number of the selected bands exceeds 15, RLFFC still performs better than All Bands in the first graph of FIGS. 4A-4C, which verifies the effectiveness of RLFFC in band selection.

Figures 5A, 5B:
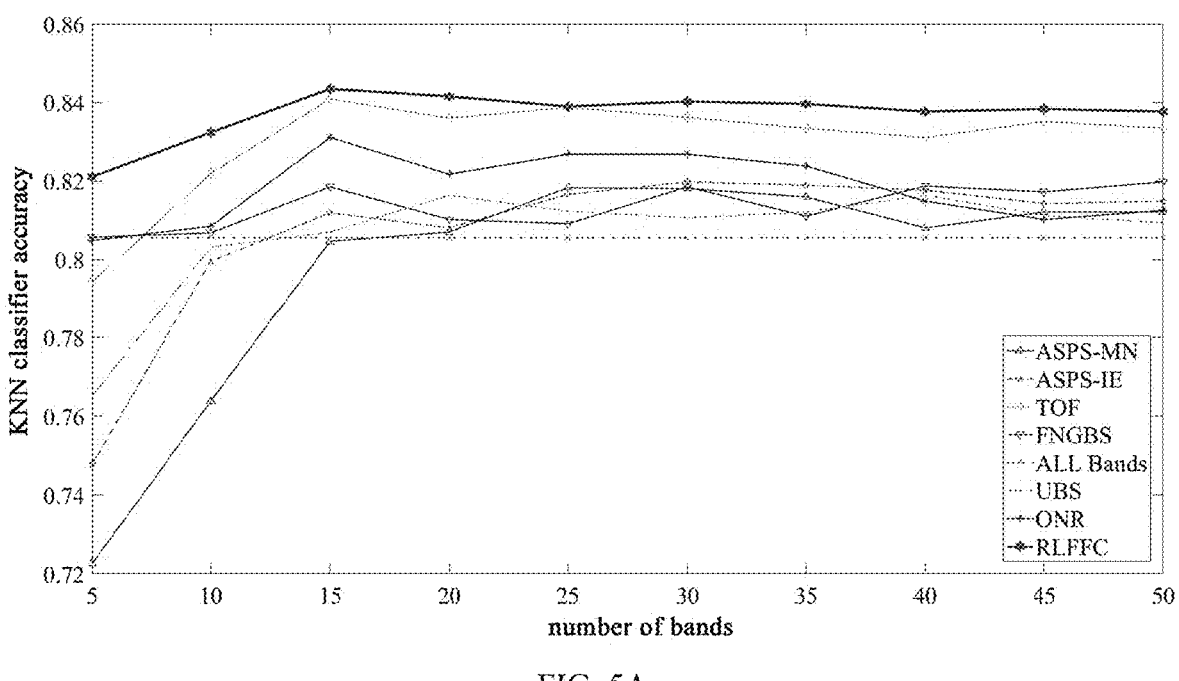
FIGS. 5A-5C show the overall-accuracy curves of different hyperspectral image band selection methods on the KSC dataset according to Embodiment II.
Figure 5C:
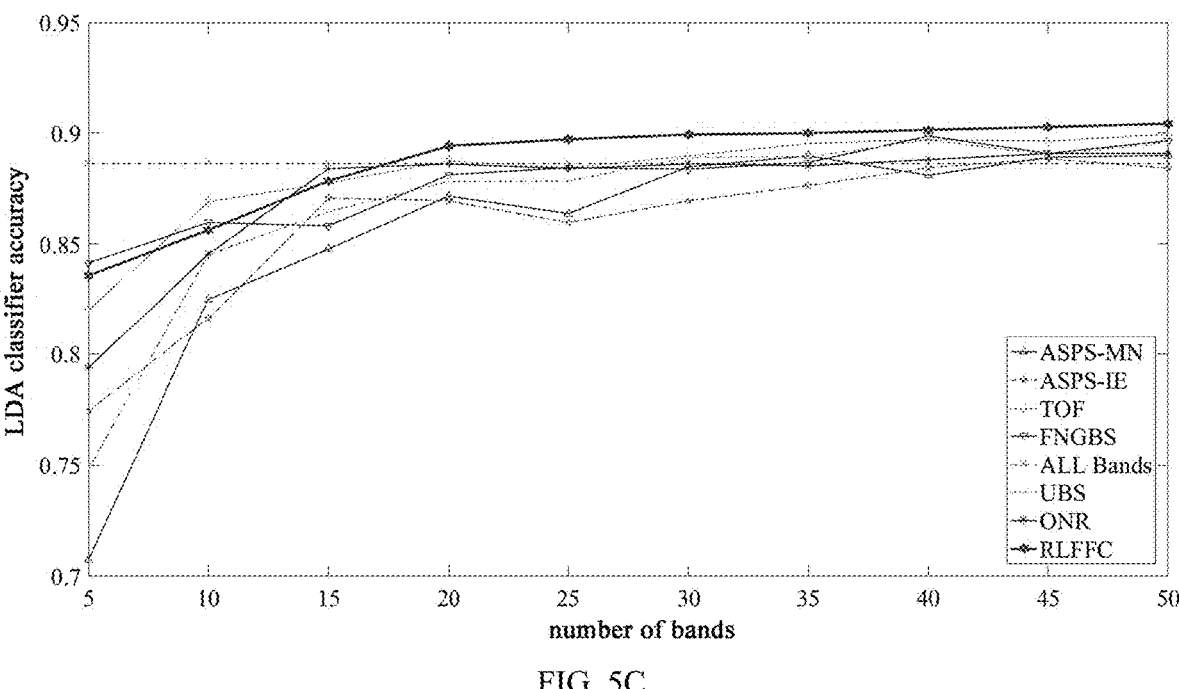

FIGS. 5A-5C show the results of all competitors on the KSC dataset. From FIGS. 5A-5C, it can be seen that in most cases, the performance of RLFFC is the best. In addition, when the number of selected bands is 5, the result of RLFFC is nearly 2% higher than the second place (ONR) in the first graph of FIGS. 5A-5C. In the second and third graphs of FIGS. 5A-5C, although FNGBS and TOF perform well, RLFFC still performs better than them. For example, when the number of the selected bands exceeds 20, the performance of RLFFC is always better than that of FNGBS and TOF. Overall, RLFFC can also achieve satisfactory results on the three classifiers on the dataset.

Figure 6A:
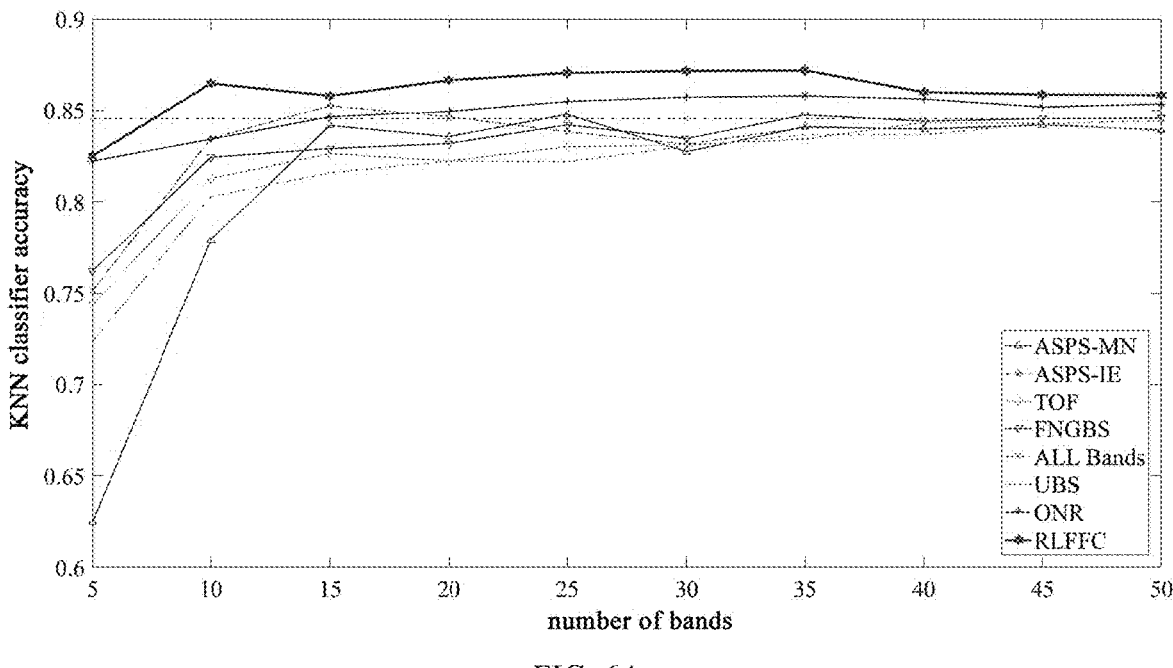
FIGS. 6A-6C show the overall-accuracy curves of different hyperspectral image band selection methods on the Botswana dataset according to Embodiment II.
Figure 6B:
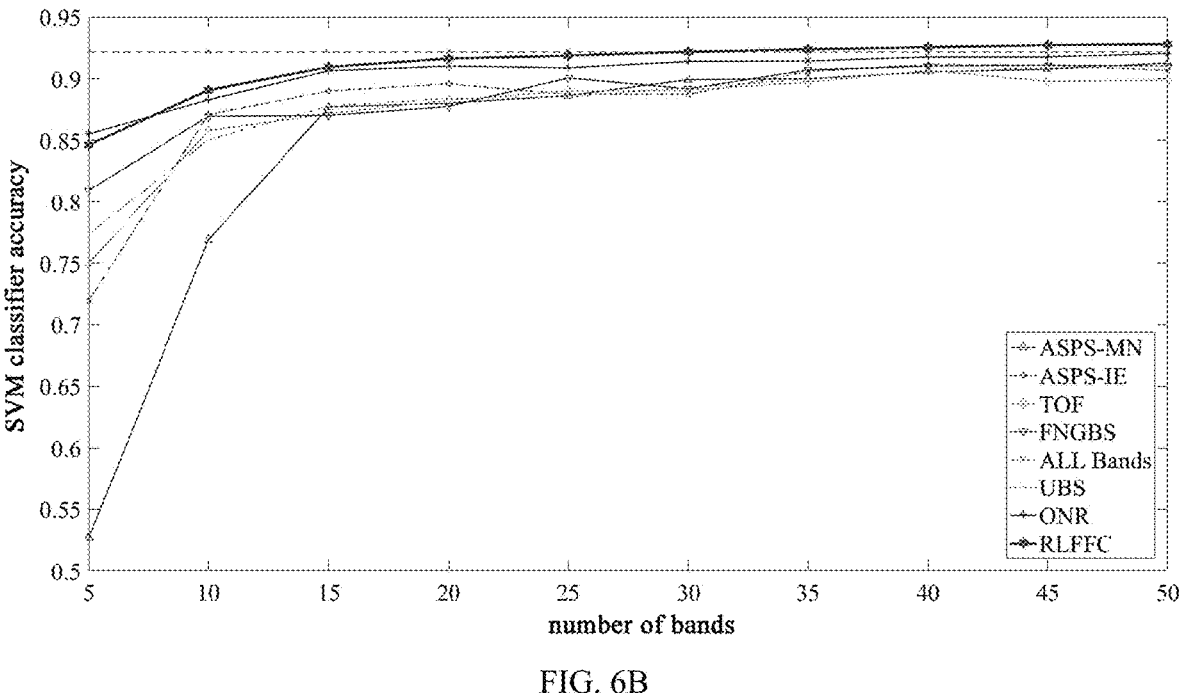
Figure 6C:
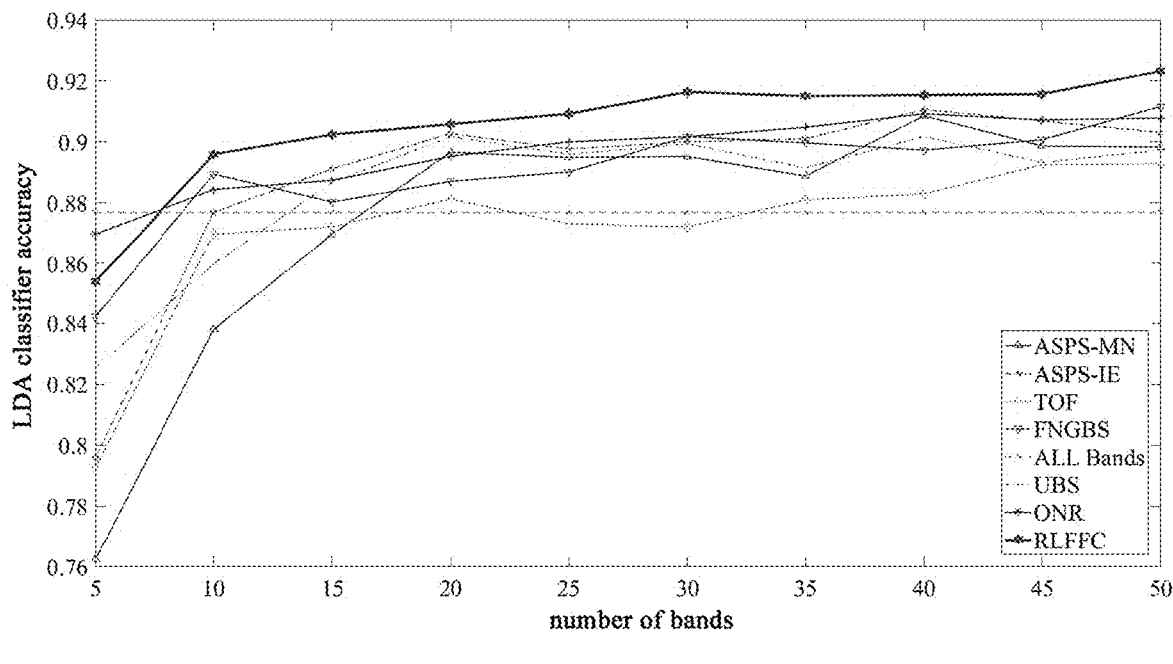

FIGS. 6A-6C show the results of all algorithms on the Botswana dataset. From the curves in FIGS. 6A-6C, it can be seen that RLFFC performs the best on all three classifiers except when the number of the selected bands is 5. On the contrary, UBS and ASPS_MN perform poorly. In addition, when the number of the selected bands is 5, the results of ASPS_MN (62.4% and 52.7%) are significantly lower than those of other algorithms in the first and second graphs of FIGS. 6A-6C. In the third graph of FIGS. 6A-6C the method proposed in the article is better than other algorithms. For example, compared to the second-placed ONR, RLFFC can achieve an improvement of more than 1.5%. Therefore, the proposed method can achieve excellent performance on the dataset.

Figures 7A, 7B:
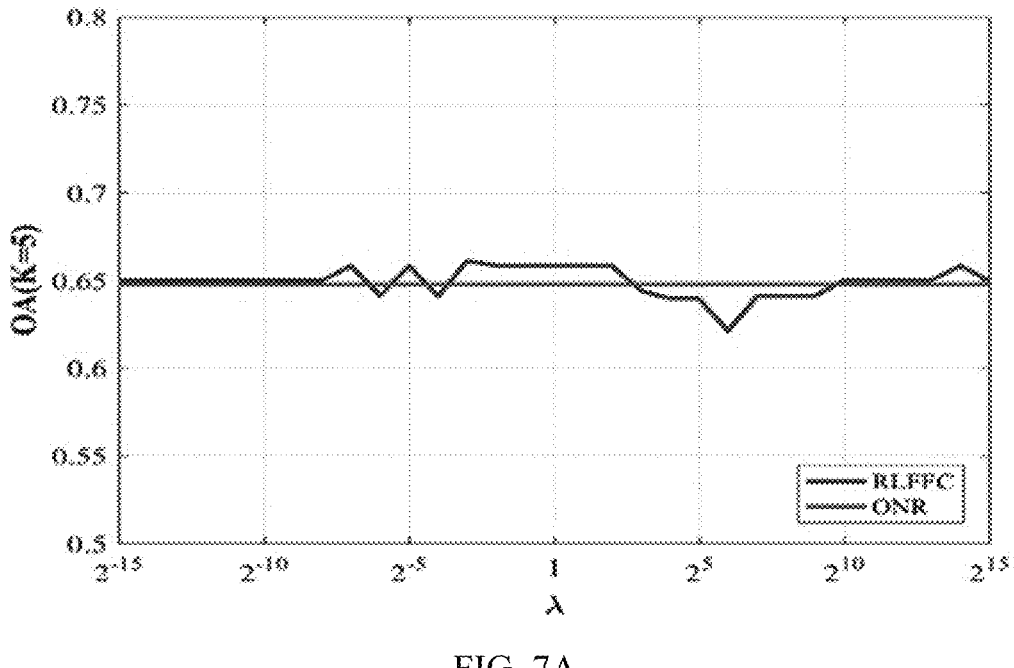
FIGS. 7A-7C show the parameter sensitivity analysis of the hyperspectral image band selection method on the Indian Pines dataset according to Embodiment II.
Figure 7C:
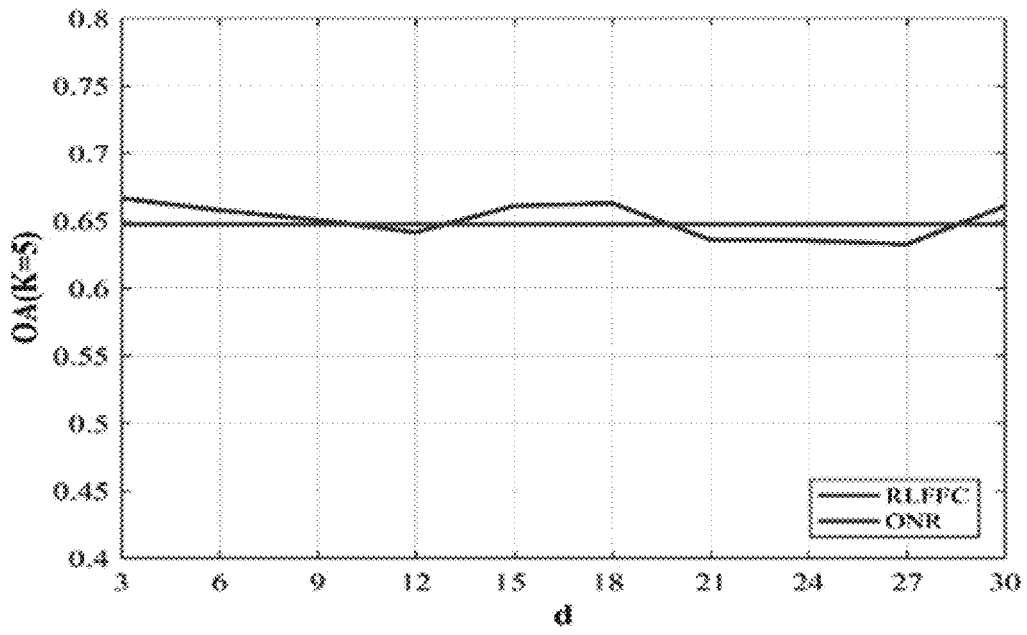
Figure 8A:
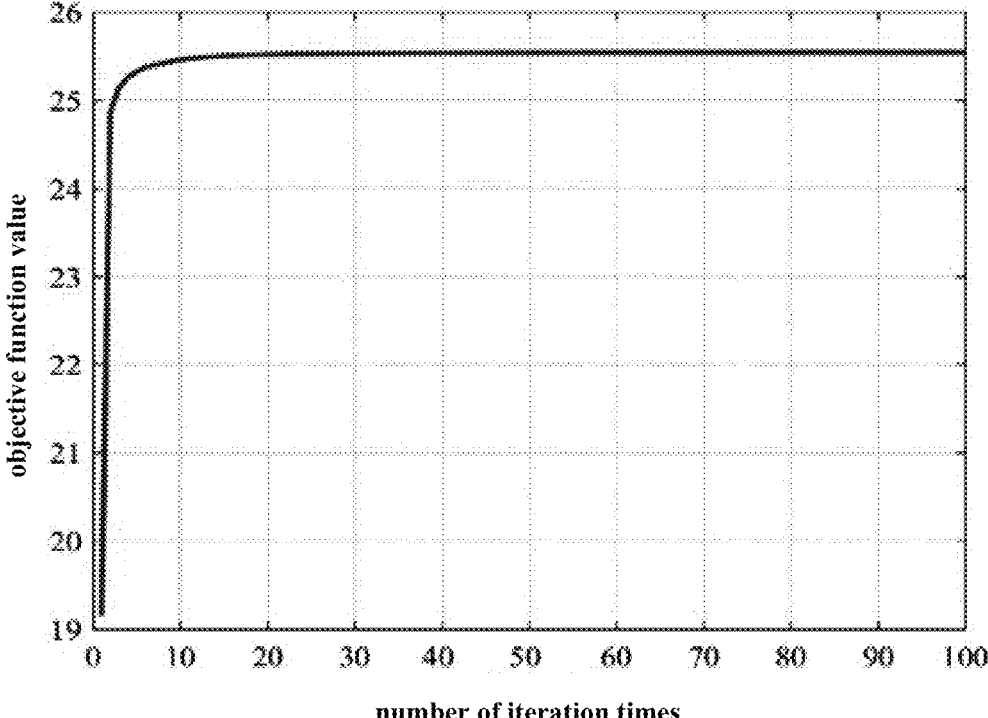
FIGS. 8A-8D show objective function iteration values of the hyperspectral image band selection method on four experimental datasets according to Embodiment II.
Figure 8B:
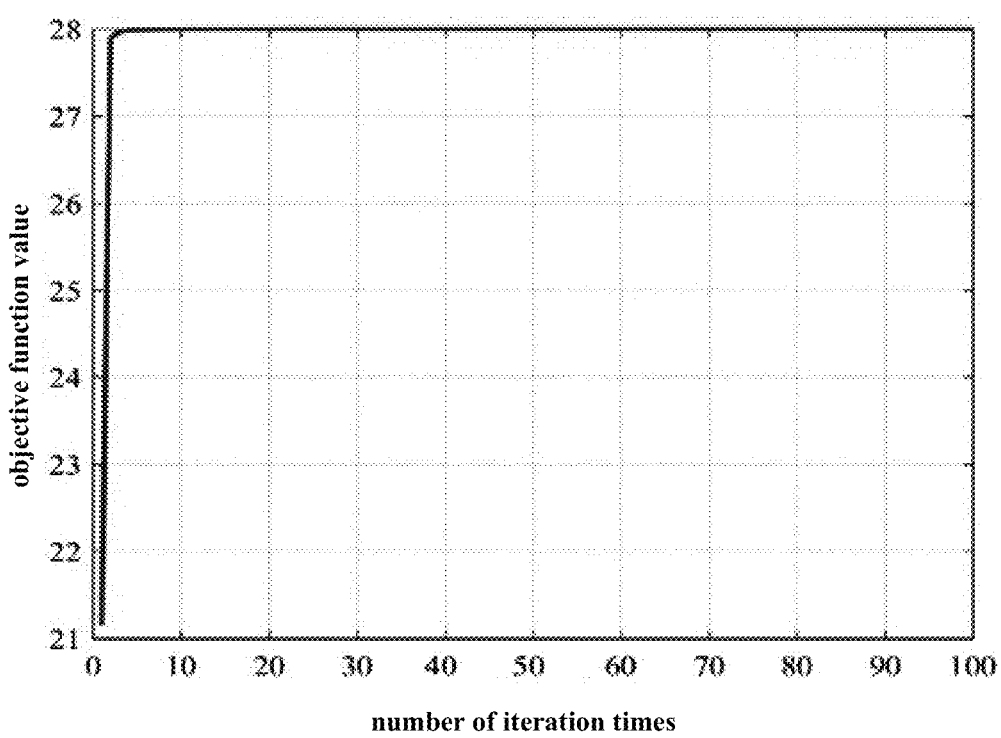
Figure 8C:
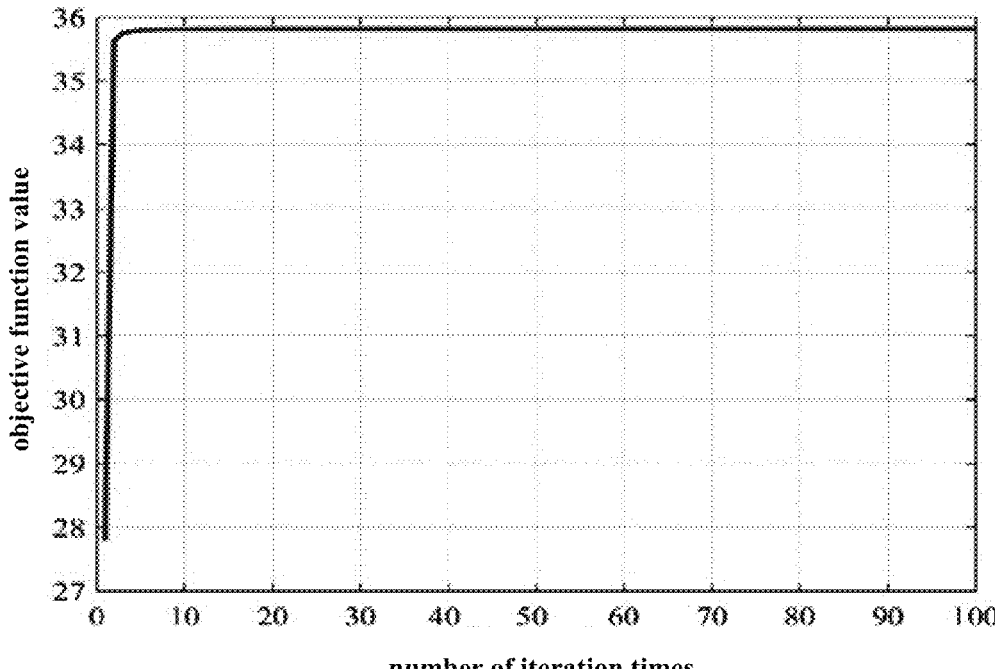
Figure 8D:
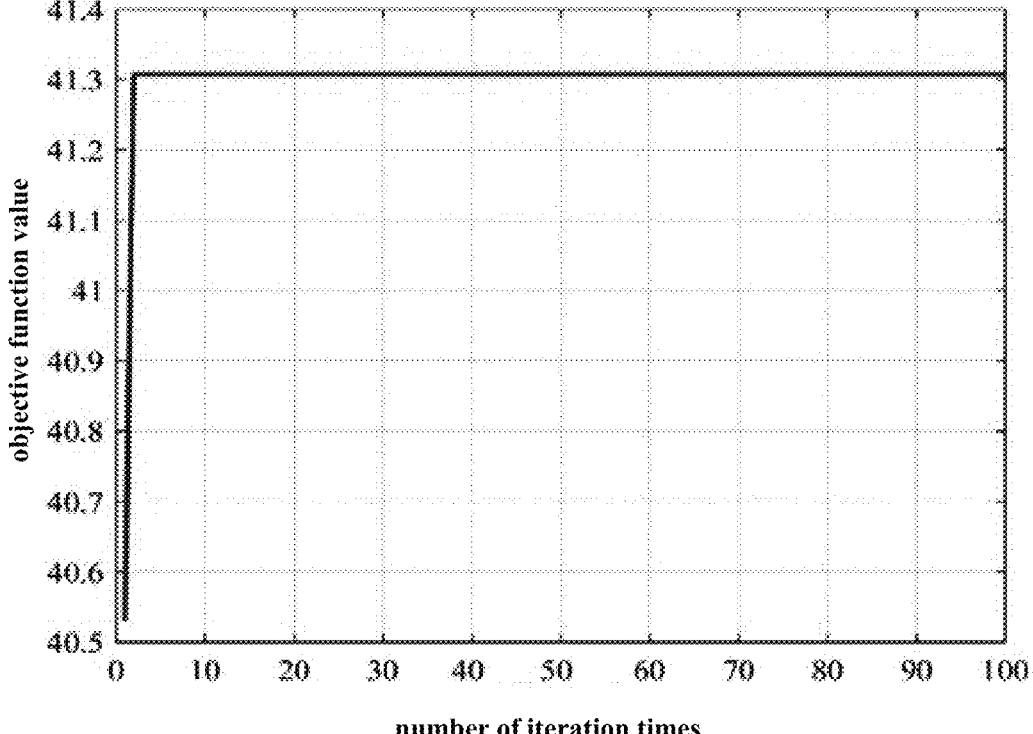

As seen from the objective function, the proposed method has three parameters, namely λ, β, and d. In order to investigate the impact of the three parameters on the final result, we set the number of the selected bands to 5 and selected the second-placed ONR as the reference object. On the KNN classifier, two parameters were fixed each time, and the performance of RLFFC is shown by changing the values of other parameters. The specific results are shown in FIGS. 7A-7C. Due to similar results on other datasets and classifiers, we have omitted them. In the first and second graphs of FIGS. 7A-7C, it can be found that the results of RLFFC fluctuate less, indicating that RLFFC is not very sensitive to the parameters λ and β, which also indicates that RLFFC can achieve satisfactory results even within a large parameter range. Therefore, in the experiment, we set the value ranges of the two parameters to [2^−15, . . . 2^15] and [0.01, 0.02, . . . 0.1], respectively. In order to facilitate the selection of the optimal parameters for different datasets, a grid search method was adopted in the experiment to determine the optimal parameters for each dataset. As far as we know, how to determine the dimension of latent features is an unresolved problem, and there is currently no effective method to determine the optimal latent feature dimension. Therefore, we adopt a grid search strategy to determine an approximate range, as shown in the third graph of FIGS. 7A-7C. In the third graph of FIGS. 7A-7C, it can be found that RLFFC is not very sensitive to the feature dimensions. In order to reduce the impact of parameter d on the final result, in the experiment, we set the values of the parameter d for the four datasets to be 5, 6, 8, and 5, respectively. FIGS. 8A-8D show the values of the objective function after each iteration. It can be found that RLFFC can quickly converge on the datasets.

Embodiment III

The embodiment provides a hyperspectral image band selection system based on latent feature fusion, and the system comprises:

a hyperspectral image segmentation module, which is used for inputting a hyperspectral image cube and segmenting the inputted hyperspectral image cube into several regions by superpixel segmentation;

a latent feature learning module, which is used for learning low-dimensional latent features corresponding to the several regions from the several regions respectively to obtain a latent feature matrix of all the regions;

a calculation module, which is used for calculating the average Laplacian matrix and the average latent feature matrix of the hyperspectral image cube;

a latent feature fusion module, which is used for fusing the latent feature matrix, the average Laplacian matrix, and the average latent feature matrix of all the regions to obtain a low-dimensional self-representation matrix of the hyperspectral image cube; and a hyperspectral band selecting module, which is used for clustering the obtained low-dimensional self-representation matrix by a k-means algorithm to obtain an optimal band subset of the hyperspectral image cube.

Further, in the hyperspectral image segmentation module, segmenting the inputted hyperspectral image cube into several regions by superpixel segmentation is completed by adopting an ERS entropy rate superpixel segmentation algorithm.

Further, in the hyperspectral image segmentation module, the inputted hyperspectral image cube is segmented into several regions, with the number of the segmented regions represented as:

$$N = 500 \times \frac{N_z}{P} + 40 \times \frac{N_z}{N_b \times \sqrt{res}}$$

wherein N represents the optimal segmentation number for each hyperspectral image cube; $N_z$ represents the number of non-zero regions at the edge of a detected hyperspectral image; P represents pixels contained in each band; $N_b$ represents a fixed constant; res represents a spatial resolution of each hyperspectral image.

Further, in the latent feature learning module, the low-dimensional latent features corresponding to the several regions are learned from the several regions respectively to obtain the latent feature matrix of all the segmented regions, expressed as:

$$\max_{Y^{(i)}} Tr\left(Y^{(i)^T} E^{(i)} Y^{(i)}\right) \text{ s.t. } Y^{(i)^T} Y^{(i)} = I$$

wherein $Y^{(i)}$ represents the low-dimensional latent feature matrix corresponding to the i-th segmented region; $E^{(i)}$ represents the Laplacian matrix corresponding to the i-th segmented region; I represents an identity matrix. The Laplacian matrix corresponding to each segmented region is specifically represented as follows:

$$E^{(i)} = D^{-\frac{1}{2}} W D^{-\frac{1}{2}}$$

wherein W represents a similarity matrix between samples in each segmented region and is mainly used for calculating an Euclidean distance between samples to measure the similarity between the samples; D represents a diagonal matrix, expressed as:

$$D_{jj} = \sum W_{:,j}$$

wherein j represents the j-th sample in the segmented region; $D_{jj}$ represents the elements in the j-th row and j-th column of the matrix $$D; \sum W_{:,j}$$

represents the sum of all elements in the j-th column of W.

Further, in the latent feature fusion module, the latent feature matrix, the average Laplacian matrix, and the average latent feature matrix of all the regions are fused to obtain the low-dimensional self-representation matrix of the hyperspectral image cube, expressed as:

$$\max_{F,R,\gamma} Tr\left(F^T \sum_{i=1}^{N} \gamma_i Y^{(i)} R^{(i)}\right) + \lambda Tr\left(F^T \overline{F}\right) + \beta Tr\left(F^T L F\right)$$

$$\text{s.t. } F^T F = I_d, R^{(i)^T} R^{(i)} = I_d, \sum_{i=1}^{N} \gamma_i^2 = 1, \gamma_i \geq 0$$

wherein F represents the low-dimensional self-representation matrix of the fused hyperspectral image; $\gamma_i$ represents a contribution rate of each segmented region; $Y^{(i)}$ represents the low-dimensional latent feature matrix corresponding to the i-th segmented region; $R^{(i)}$ represents a rotation matrix corresponding to the features of each segmented region; $\overline{F}$ represents an average latent feature matrix; L represents an average Laplacian matrix; $\lambda$ and $\beta$ both represent equilibrium parameters; T represents the transposition of the matrix; $I_d$ represents the identity matrix with a size of d*d. The specific solution for the average Laplacian matrix L is shown as follows:

$$L = \frac{1}{N} \sum_{i=1}^{N} E^{(i)}$$

wherein $E^{(i)}$ is the Laplacian matrix corresponding to each segmented region; N is the number of the segmented regions corresponding to an original dataset.

The specific solution for the average latent feature matrix $\overline{F}$ is shown as follows:

$$\max_{\overline{F}} Tr\left(\overline{F}^T L \overline{F}\right) \text{ s.t. } \overline{F}^T \overline{F} = I$$

Compared with the prior art, the present application mainly uses superpixel segmentation to segment the hyperspectral image into a plurality of regions, and low-dimensional latent features are learned from each segmented region to further enhance the separability of ground objects between different regions. Then, a shared latent feature self-representation matrix of the hyperspectral image is obtained by fusing the low-dimensional latent features of each segmented region, thereby reducing spectral differences between different regions. Finally, the k-means algorithm is used to select the optimal feature band subset from the shared latent feature self-representation matrix.

It should be noted that the hyperspectral image band selection system based on latent feature fusion provided by the embodiment is similar to Embodiment I, and it is not repeated herein.

Compared with the prior art, the embodiment mainly uses superpixel segmentation to segment the hyperspectral image into a plurality of regions, and low-dimensional latent features are learned from each segmented region to further enhance the separability of ground objects between different regions. Then, a shared latent feature self-representation matrix of the hyperspectral image is obtained by fusing the low-dimensional latent features of each segmented region, thereby reducing spectral differences between different regions. Finally, the k-means algorithm is used to select the optimal feature band subset from the shared latent feature self-representation matrix.

It should be noted that the above description is only preferred embodiments of the present application and the principles of the employed technologies. It should be understood by those skilled in the art that the present application is not limited to the particular embodiments described herein, and those skilled in the art can make various obvious changes, rearrangements, and substitutions without departing from the protection scope of the present application. Therefore, although the above embodiments have provided a detailed description of the present application, the present application is not limited to the above embodiments, and may further include other equivalent embodiments without departing from the spirit of the present application, and the scope of the present application is determined by the scope of the appended claims.

The invention claimed is:

1. A hyperspectral image band selection method based on latent feature fusion, comprising:

S1, inputting a hyperspectral image cube and segmenting the hyperspectral image cube into N regions by superpixel segmentation to obtain segmented regions;

S2, learning low-dimensional latent features corresponding to the N regions from the N regions respectively to obtain a latent feature matrix of all the regions;

S3, calculating an average Laplacian matrix and an average latent feature matrix of the hyperspectral image cube;

S4, fusing the latent feature matrix, the average Laplacian matrix, and the average latent feature matrix of all the regions to obtain a low-dimensional self-representation matrix of the hyperspectral image cube; and S5, clustering the low-dimensional self-representation matrix by a k-means algorithm to obtain an optimal band subset of the hyperspectral image cube.

2. The hyperspectral image band selection method according to claim 1, wherein in S1, the hyperspectral image cube into the N regions by superpixel segmentation is segmented by adopting an ERS entropy rate superpixel segmentation algorithm.

3. The hyperspectral image band selection method according to claim 2, wherein in S1, a number of the segmented regions is represented as:

$$N = 500 \times \frac{N_z}{P} + 40 \times \frac{N_z}{N_b \times \sqrt{res}}$$

wherein N represents an optimal segmentation number for the hyperspectral image cube; $N_z$ represents a number of non-zero regions at an edge of a detected hyperspectral image; P represents pixels contained in each band; $N_b$ represents a fixed constant; res represents a spatial resolution of the detected hyperspectral image.

4. The hyperspectral image band selection method according to claim 1, wherein in S2, the low-dimensional latent features corresponding to the N regions are learned from the N regions respectively to obtain the latent feature matrix of all the segmented regions, expressed as:

$$\max_{Y^{(i)}} Tr\left(Y^{(i)T} E^{(i)} Y^{(i)}\right) \text{ s.t. } Y^{(i)T} Y^{(i)} = I$$

wherein $Y^{(i)}$ represents a low-dimensional latent feature matrix corresponding to an i-th segmented region; $E^{(i)}$ represents a Laplacian matrix corresponding to the i-th segmented region; I represents an identity matrix;

the Laplacian matrix corresponding to each of the segmented regions is specifically represented as follows:

$$E^{(i)} = D^{-\frac{1}{2}} W D^{-\frac{1}{2}}$$

wherein W represents a similarity matrix between samples in each of the segmented regions; D represents a diagonal matrix, represented as:

$$D_{jj} = \sum W_{:,j}$$

wherein j represents a j-th sample in the segmented regions; $D_{jj}$ represents elements in a j-th row and j-th column of the diagonal matrix $$D; \sum W_{:,j}$$

represents a sum of all elements in a j-th column of the similarity matrix W.

5. The hyperspectral image band selection method according to claim 4, wherein in S4, the latent feature matrix, the average Laplacian matrix, and the average latent feature matrix of all the regions are fused to obtain the low-dimensional self-representation matrix of the hyperspectral image cube, expressed as:

$$\max_{F,R,\gamma} Tr\left(F^T \sum_{i=1}^{N} \gamma_i Y^{(i)} R^{(i)}\right) + \lambda Tr\left(F^T \overline{F}\right) + \beta Tr\left(F^T LF\right)$$

$$\text{s.t. } F^T F = I_d, R^{(i)T} R^{(i)} = I_d, \sum_{i=1}^{N} \gamma_i^2 = 1, \gamma_i \geq 0$$

wherein F represents a low-dimensional self-representation matrix of a fused hyperspectral image; $\gamma_i$ represents a contribution rate of each of the segmented regions; $Y^{(i)}$ represents a low-dimensional latent feature matrix corresponding to the i-th segmented region; $R^{(i)}$ represents a rotation matrix corresponding to the i-th segmented region; $\overline{F}$ represents an average latent feature matrix; L represents an average Laplacian matrix; $\lambda$ and $\beta$ both represent equilibrium parameters; T represents a transposition of a matrix; $I_d$ represents an identity matrix with a size of d*d.

6. A hyperspectral image band selection system based on latent feature fusion, comprising a processor comprising:

a hyperspectral image segmentation module, used for inputting a hyperspectral image cube and segmenting the hyperspectral image cube into N regions by superpixel segmentation to obtain segmented regions;

a latent feature learning module, used for learning low-dimensional latent features corresponding to the N regions from the N regions respectively to obtain a latent feature matrix of all the regions;

a calculation module, used for calculating an average Laplacian matrix and an average latent feature matrix of the hyperspectral image cube;

a latent feature fusion module, used for fusing the latent feature matrix, the average Laplacian matrix, and the average latent feature matrix of all the regions to obtain a low-dimensional self-representation matrix of the hyperspectral image cube; and a hyperspectral band selecting module, used for clustering the low-dimensional self-representation matrix by a k-means algorithm to obtain an optimal band subset of the hyperspectral image cube.

7. The hyperspectral image band selection system according to claim 6, wherein in the hyperspectral image segmentation module, the inputted hyperspectral image cube into the N regions by superpixel segmentation is segmented by adopting an ERS entropy rate superpixel segmentation algorithm.

8. The hyperspectral image band selection system according to claim 7, wherein in the hyperspectral image segmentation module, a number of the segmented regions is represented as:

$$N = 500 \times \frac{N_z}{P} + 40 \times \frac{N_z}{N_b \times \sqrt{res}}$$

wherein N represents an optimal segmentation number for the hyperspectral image cube; $N_z$ represents a number of non-zero regions at an edge of a detected hyperspectral image; P represents pixels contained in each band; $N_b$ represents a fixed constant; res represents a spatial resolution of the detected hyperspectral image.

9. The hyperspectral image band selection system according to claim 6, wherein in the latent feature learning module, the low-dimensional latent features corresponding to the N regions are learned from the N regions respectively to obtain the latent feature matrix of all the segmented regions, expressed as:

$$\max_{Y^{(i)}} Tr\left(Y^{(i)^T} E^{(i)} Y^{(i)}\right) \text{ s.t. } Y^{(i)^T} Y^{(i)} = I$$

wherein $Y^{(i)}$ represents a low-dimensional latent feature matrix corresponding to an i-th segmented region; $E^{(i)}$ represents a Laplacian matrix corresponding to the i-th segmented region; I represents an identity matrix;

the Laplacian matrix corresponding to each of the segmented regions is specifically represented as follows:

$$E^{(i)} = D^{-\frac{1}{2}} W D^{-\frac{1}{2}}$$

wherein W represents a similarity matrix between samples in each of the segmented regions; D represents a diagonal matrix, represented as:

$$D_{jj} = \sum W_{:,j}$$

wherein j represents a j-th sample in the segmented regions; $D_{jj}$ represents elements in a j-th row and j-th column of the diagonal matrix $$D; \sum W_{:,j}$$

represents a sum of all elements in a j-th column of the similarity matrix W.

10. The hyperspectral image band selection system according to claim 9, wherein in the latent feature fusion module, the latent feature matrix, the average Laplacian matrix, and the average latent feature matrix of all the regions are fused to obtain the low-dimensional self-representation matrix of the hyperspectral image cube, expressed as:

$$\max_{F,R,\gamma} Tr\left(F^T \sum_{i=1}^{N} \gamma_i Y^{(i)} R^{(i)}\right) + \lambda Tr\left(F^T \overline{F}\right) + \beta Tr\left(F^T LF\right)$$

$$\text{s.t. } F^T F = I_d, R^{(i)^T} R^{(i)} = I_d, \sum_{i=1}^{N} \gamma_i^2 = 1, \gamma_i \geq 0$$

wherein F represents a low-dimensional self-representation matrix of a fused hyperspectral image; $\gamma_i$ represents a contribution rate of each of the segmented regions; $Y^{(i)}$ represents a low-dimensional latent feature matrix corresponding to the i-th segmented region; $R^{(i)}$ represents a rotation matrix corresponding to the i-th segmented region; $\overline{F}$ represents an average latent feature matrix; L represents an average Laplacian matrix; $\lambda$ and $\beta$ both represent equilibrium parameters; T represents a transposition of a matrix; $I_d$ represents an identity matrix with a size of d*d.

* * * * *